E. VALOPPI.
TRANSMISSION CLUTCH.
APPLICATION FILED SEPT. 8, 1913.
1,126,924.
Patented Feb. 2, 1915.
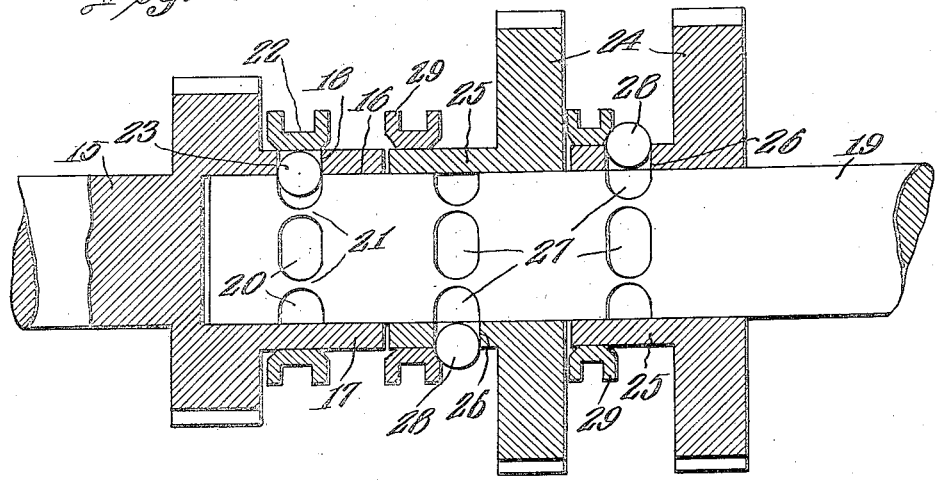
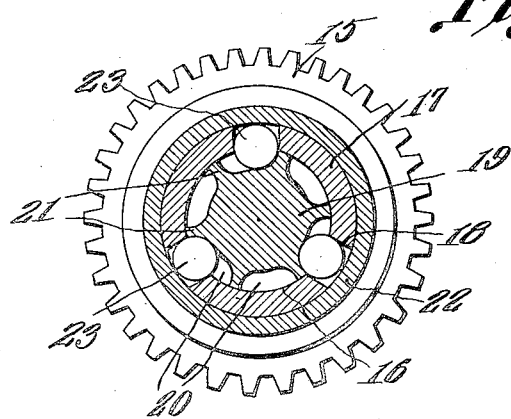
Witnesses
Eugene Valoppi,
Inventor
by
Attorneys

UNITED STATES PATENT OFFICE.

EUGENE VALOPPI, OF SCRANTON, PENNSYLVANIA.

TRANSMISSION-CLUTCH.

1,126,924. Specification of Letters Patent. Patented Feb. 2, 1915.

Application filed September 8, 1913. Serial No. 788,772.

*To all whom it may concern:*

Be it known that I, EUGENE VALOPPI, a citizen of the United States, residing at Scranton, in the county of Lackawanna and State of Pennsylvania, have invented a new and useful Transmission-Clutch, of which the following is a specification.

The present invention appertains to transmission clutches.

It is the object of the present invention to provide novel and improved clutch mechanism for automobile transmissions, and the like, in order that the driving and driven elements may be brought into and out of engagement in a unique manner.

With the foregoing general object outlined and with other objects in view, which will be apparent as the nature of the invention is better understood, the present invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawing, wherein :—

Figure 1 is a longitudinal sectional view of the invention. Fig. 2 is a cross sectional view thereof.

The driving shaft or member has been designated by the numeral 15, the same having a short bore or socket 16 provided in one end, to form the sleeve or boss 17. The sleeve or boss 17 is provided with an annular series of apertures or openings 18.

The driven shaft 19 has one end journaled within the bore or socket 16 and is provided with a circumferential series of circumferentially elongated sockets 20 coöperating with the openings 18, the sockets 20 forming the abutments 21 therebetween.

A clutch ring 22 is slidable upon the sleeve or boss 17 to and from the openings 18, and preferably has its inner edges beveled. Clutch balls 23 are disposed within the openings 18 of the sleeve or boss 17, and are designed to be thrust inwardly by the clutch ring 22, it being noted that when the clutch ring 22 is slid away from the openings 18, the balls 23 will be thrust outwardly by the rounded ends of the sockets 20, or by the abutments 21, in order that the shaft 19 may lie in a passive or idle condition, while the driving shaft 15 rotates.

The driven shaft 19 may be readily brought into engagement with the driving shaft, by sliding the clutch ring 22 toward the openings 18, which will cause the clutch balls 23 to be thrust into engagement with the sockets 20 of the shaft 19, whereby the shaft 19 will be driven with the shaft 15. The clutch ring 22 may be slid back and forth by any suitable means (not shown), and when slid away from the openings 18, are designed to be thrust inwardly by the from dropping or being thrown entirely out of the openings 18, although any suitable means may be provided for maintaining the clutch balls within the openings 18 and for permitting them to be thrown partially outward by the abutments 21 to let the shaft 15 rotate freely without rotating the shaft 19.

Fig. 1 also illustrates a pair of gear wheels 24 mounted loosely upon the shaft 19 and having bosses or collars 25 provided with the annular series of apertures 26 coöperating with the circumferentially arranged sockets 27 in the shaft 19. Clutch balls 28 are disposed within the openings 26, and are adapted to be thrust into engagement with the sockets 27 by the clutch rings 29 mounted upon the bosses or collars 25, in the manner above described. The said figure illustrates how the gear wheels 24 may be thrown into engagement with the shaft 19, on the same principle as above described.

Having thus fully described the invention, what is claimed is:—

1. In a device of the character described, a shaft having peripheral sockets, a rotary member mounted on the said shaft and having a collar surrounding the sockets and provided with apertures coöperating therewith, clutch members disposed in the said apertures, and means mounted upon the said collar and coöperating with the clutch members to project the same into the sockets.

2. In a device of the character described, a shaft having peripheral sockets, a rotary member mounted on the said shaft and having a collar surrounding the sockets and provided with apertures coöperating therewith, clutch balls disposed in the said apertures, and a ring slidably mounted on the said collar and arranged to thrust the balls partially into the said sockets.

In testimony that I claim the foregoing as my own, I have hereto affixed my signature in the presence of two witnesses.

EUGENE VALOPPI.

Witnesses:
UMBERTO BOLINARI,
SERAFINO COLLEIER.